Aug. 25, 1931.                J. P. GREEN                 1,820,453
                        SYSTEM OF REFRIGERATION
                        Filed Dec. 19, 1925        4 Sheets-Sheet 1
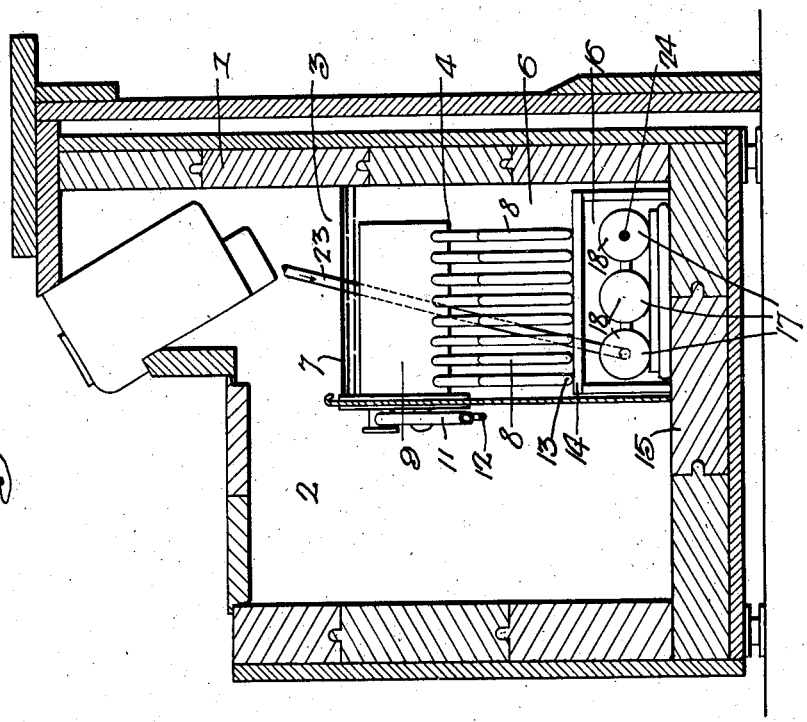
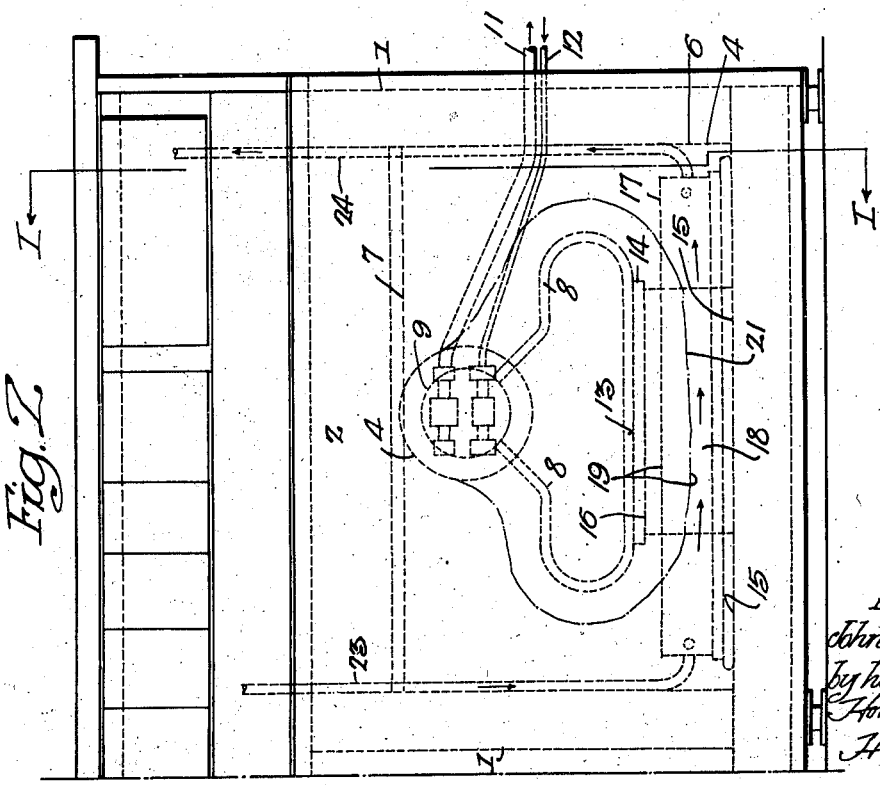

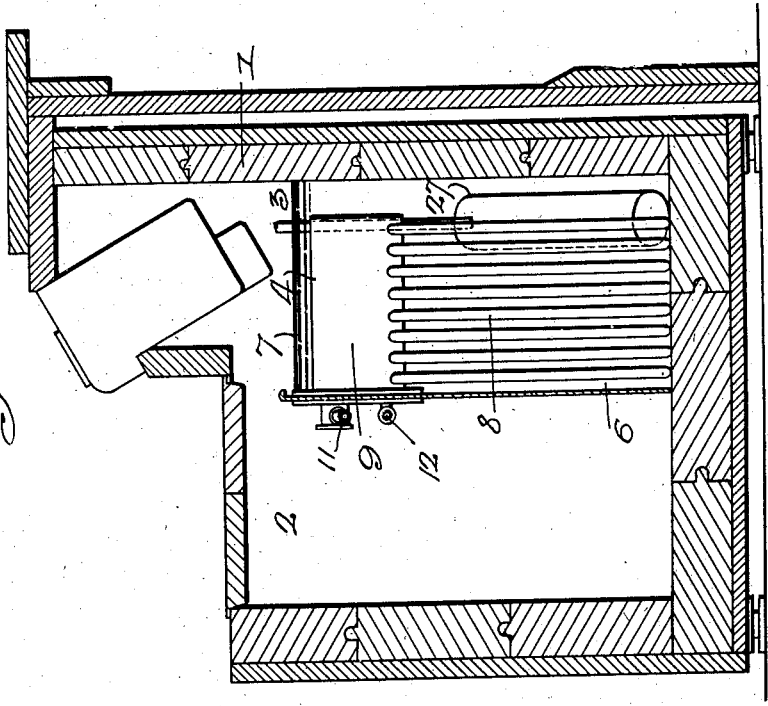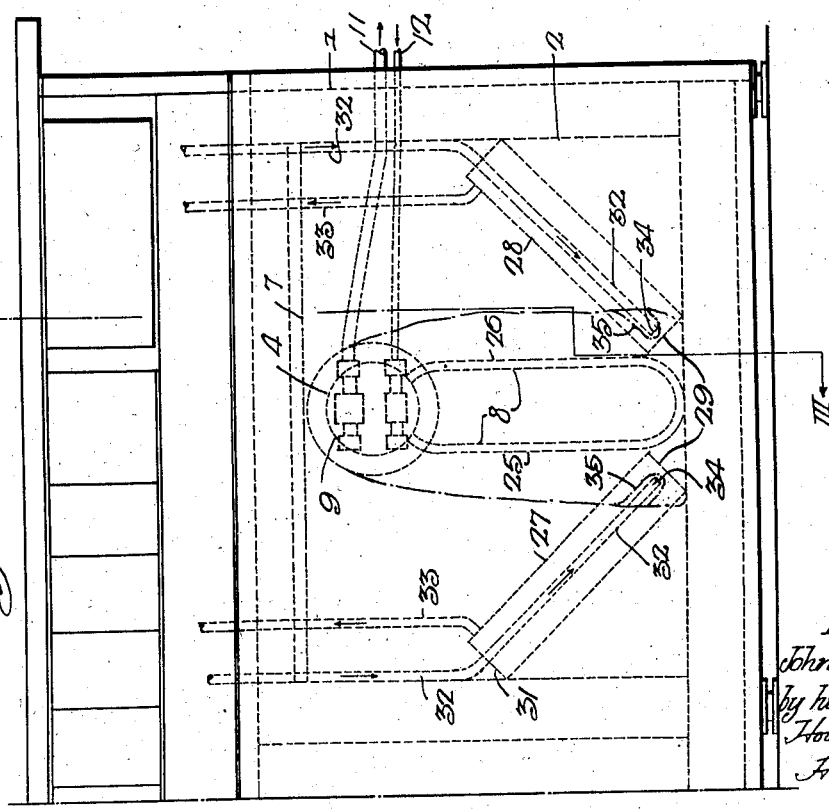

Aug. 25, 1931.   J. P. GREEN   1,820,453
SYSTEM OF REFRIGERATION
Filed Dec. 19, 1925    4 Sheets-Sheet 3
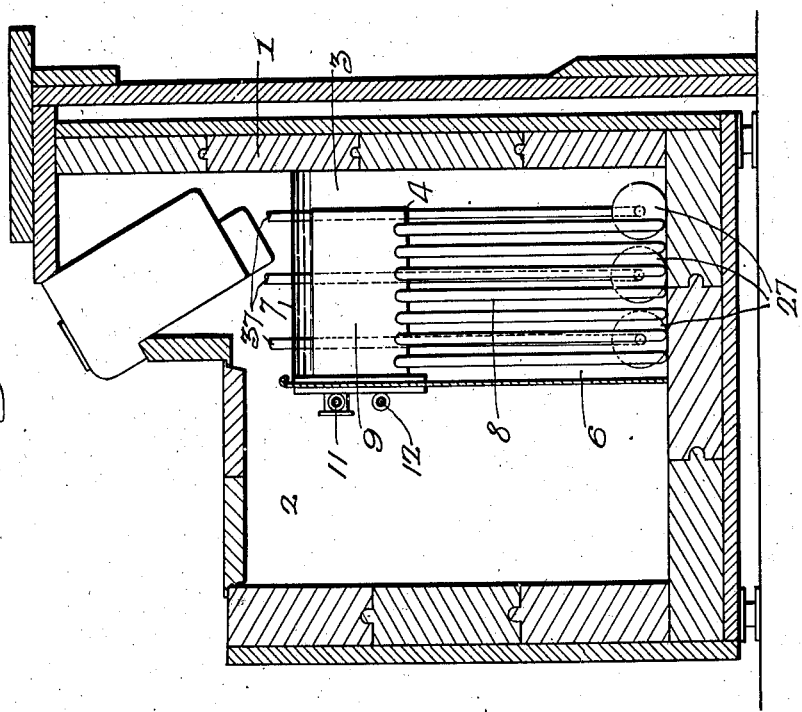
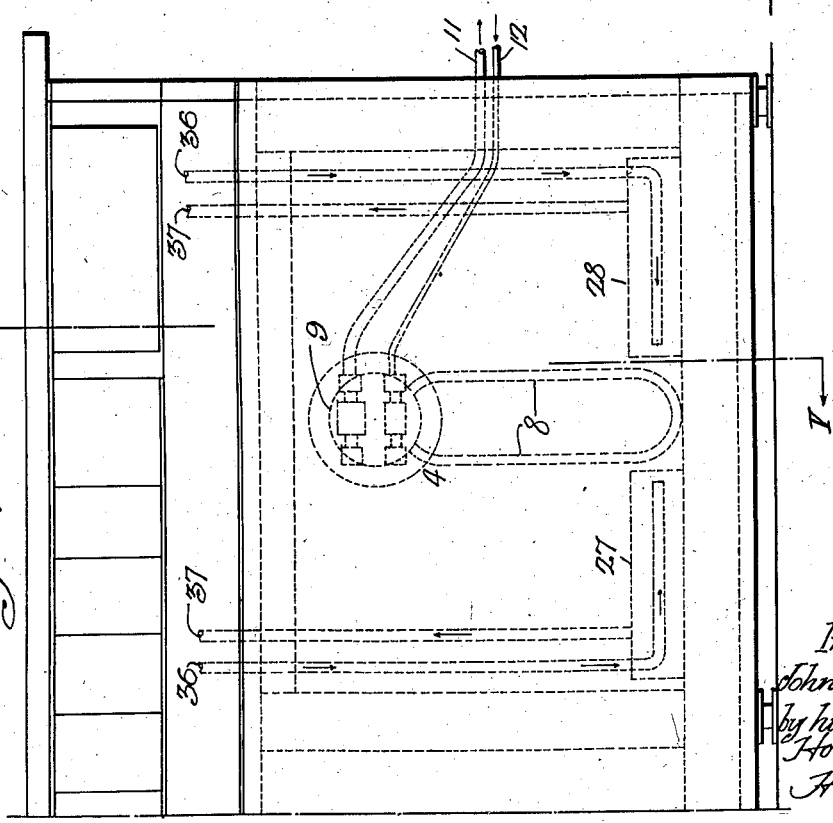

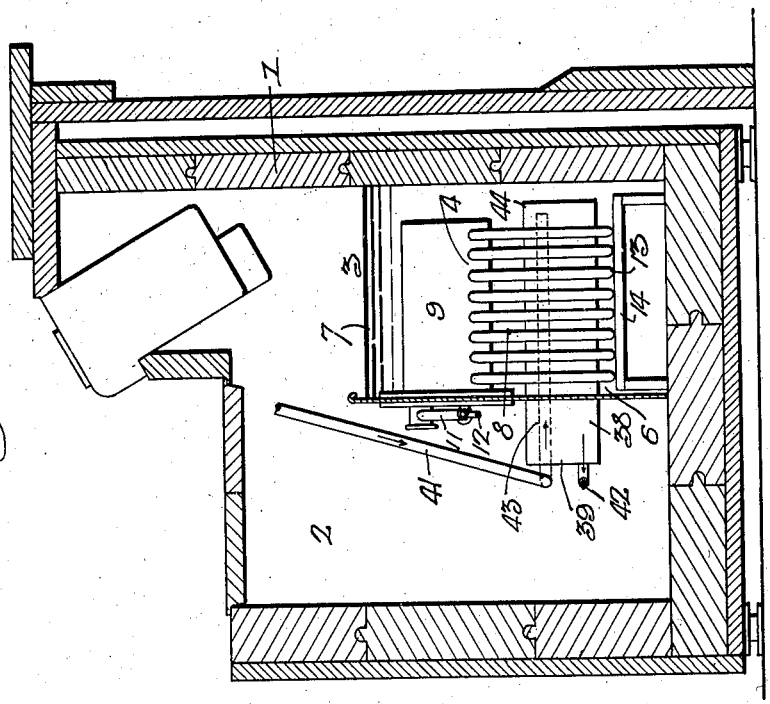

Patented Aug. 25, 1931

1,820,453

UNITED STATES PATENT OFFICE

JOHN P. GREEN, OF PHILADELPHIA, PENNSYLVANIA

SYSTEM OF REFRIGERATION

Application filed December 19, 1925. Serial No. 76,516.

My invention relates to refrigerating systems having particular relation to such systems as are applicable to soda fountains and the like, and it has for one object the provision of a refrigerating system that shall be characterized by the exceedingly low temperature to which the fluid to be cooled may be lowered.

Another object of my invention is to provide a system of refrigeration which utilizes the heat of fusion of ice to effect a further reduction in the temperature of the fluid to be cooled.

A further object of my invention is to provide refrigerating apparatus wherein a pipe carrying the fluid to be cooled is positioned in such relation to the refrigerating loops or conduits that a portion of said fluid is caused to flow over a frozen portion thereof.

Other objects and applications of my invention, as well as details of construction and operation, whereby my invention may be practiced, will appear more fully hereinafter, when taken in connection with the accompanying drawings, wherein, Fig. 1 is a detail longitudinal sectional view of one form of embodiment of my invention, the sectional plane being taken on the line I—I of Fig. 2;

Fig. 2 is a side elevational view of the structure of Fig. 1;

Figs. 3 and 4 are views similar to Figs. 1 and 2, respectively, but illustrating an alternative embodiment of my invention;

Figs. 5 and 6 are views similar to Figs 1 and 2 respectively, but illustrating a further modification; and Figs. 7 and 8 are views similar to Figs. 5 and 6, showing a still further modification.

Referring to Figs. 1 and 2, a housing 1 of usual design forms a storage chamber 2, a section 3 of which is adapted to receive a refrigerating system 4. The latter may comprise a receptacle 6 for a liquid medium 7. A plurality of refrigerating loops or coils 8 may be immersed within the liquid 7. The coils or loops 8 are connected to a header 9 which is associated by means of pipes 11 and 12 with a source of cooled refrigerant (not shown). A flattened base portion 13 of the refrigerating coil or conduit 8 is mounted on a horizontal support 14 that is so carried by a base 15 of the fluid receptacle 6 as to provide a space 16 therebetween, for reasons as will presently appear.

When a refrigerant is caused to pass through the pipes 11 and 12, a portion of the liquid adajacent to the walls of the receptacle 6 is gradually cooled until it reaches approximately 37° F., which temperature is thereafter maintained. This is due to the fact that water ceases to circulate at that point. Since the conduits carrying the fluid to be cooled have heretofore been positioned in such portions of the liquid medium 7, the effective cooling temperature was never below the temperature of said liquid, approximately 37° F.

In the course of considerable experimental work, I have found that the fluid within a certain radius of the refrigerating loops 8 is frozen. Under certain conditions, this ice region may be defined by the dot-and-dash line of Fig. 2. As a result, I so position one or more interconnected beverage cooling coils or casings 17, which define passages 18 in the space 16, that a portion 19 of each passage 18 lies within the normal freezing range of the refrigerating coils 8, whereby ice 21 may be formed therein from the beverage fluid to be cooled. The latter may be supplied through a pipe 23 and discharged through a pipe 24, both pipes being positioned in the liquid medium 7. The ice formation 21 does not completely close the passages 18, as shown in Fig. 2, so that the fluid to be cooled must flow over the same. Such ice formation may be maintained for varying loads by means of the usual automatic temperature regulating apparatus (not shown) associated with refrigerating systems. In view of the heat of fusion of ice, the temperature of the fluid leaving the casings 17 is thus below 37° F., the temperature of the surrounding liquid medium 7.

In operation, when a refrigerating fluid is supplied through the pipe 12 to the loops 13, the ice portion 21 is formed in the casings 17 from the beverage fluid to be cooled.

Since the casings 17 are not positioned wholly within the ice region, the passages 18 are not completely closed and the beverage fluid is caused to flow over the ice portion 21 where a load occurs on the beverage system 23, 18, 24. The subsequent melting of the ice portion 21 causes a large amount of heat to be absorbed from the beverage fluid passing over the same and hence said fluid is cooled to a very low temperature when it finally passes through the discharge pipe 24. The ice formation 21 also constitutes a reserve, permitting the maintenance of a desired uniform temperature for heavy overloads on the beverage cooling coils 17. Should the over-load condition be maintained, then the temperature-regulating apparatus (not shown) functions to lower the temperature of the refrigerating coils 8 until the ice portion 21 is again formed in the loops 17.

Figs. 3 and 4 illustrate a slightly different construction, but it is fundamentally based on the idea of freezing a portion of the medium to be cooled and causing the remainder thereof to pass over the frozen portion. The construction therein shown is distinguishable over Figs. 1 and 2 in that the refrigerating loops 8 have relatively flat vertical sides 25 and 26. Furthermore, a pair of casings 27 and 28 are angularly positioned with respect to the refrigerating coil 8, with a lower end 29 thereof extending into the ice region, which is defined by the dot-and-dash lines. An upper end 31 of the casings 27 and 28 is adapted to receive inlet and outlet pipes 32 and 33 for the fluid to be cooled. The inlet pipe 32 has an outlet opening 34 adjacent to the lower closed end 29 of the casing and well within the ice region.

When fluid is supplied through the pipe 32, each casing becomes completely filled, the portion positioned within the ice region being frozen. In view of the relatively warm condition of the pipe 32, the fluid surrounding the lower end thereof is not frozen solid up to the pipe 32 but an annular passage 35 is left, whereby fluid may escape from the opening 34 through the annular ice passage 35 up into the unfrozen portion of the casing. Hence the fluid to be cooled is caused to pass over ice as in the preceding construction and the heat of fusion of ice is again utilized.

While the casings 27 and 28 have been shown in tilted positions for ease of removal from the fluid receptacle 6, satisfactory operation is obtained by disposing the casings 27 and 28 in a horizontal position, as shown in Figs. 5 and 6. Should more than one pair of casings 27, 28 be required, a plurality of each may be connected in series, as shown in Figs. 1 and 2, or each casing may have its own supply and discharge pipes 36 and 37. The operation of the present structure is otherwise as indicated for the preceding figures.

My invention also contemplates a still further modification, as illustrated in Figs. 7 and 8, wherein a single casing 38 is positioned within the axis of the refrigerating loops 8, but with one end 39 thereof extending outwardly from the receptacle 6 into the open chamber portion 2 of the apparatus. As in Figs. 2 to 6 inclusive, fluid to be cooled may be supplied through a pipe 41 and discharged through a pipe 42, pipe 41 having an extension 43 terminating adjacent to an inner closed end 44 of the casing. While the operation of the present construction is similar to that described in connection with Figs. 2 to 6, inclusive, it embodies a further advantageous feature, namely a casing with an exposed outer end 39. Such construction practically eliminates the danger of freezing solid the casing 38 and consequent destruction of the same.

While I have shown several forms of embodiments of my invention, for the purpose of describing the same and illustrating its principles of construction and operation it is apparent that further changes and modifications may be made therein without departing from the spirit of my invention, and I desire, therefore, that only such limitations shall be placed thereon as are indicated in the appended claims or as are demanded by the prior art.

I claim:

1. In combination, refrigerating means adapted to form ice within a certain radius thereof and a beverage system subject to intermittent loads, comprising a conduit having a greatly enlarged elongated section extending partly within said radius in predetermined relation with said refrigerating means, whereby a predetermined portion of the beverage fluid may be frozen without interrupting the flow of the remainder through said conduit due to ice clogging said conduit.

2. A refrigerating coil positioned in a body of fluid and adapted to freeze the same within a certain radius thereof, and means forming a passage for a fluid to be cooled, said passage having a greatly enlarged elongated section extending within said radius in predetermined relation with said refrigerating coil, whereby a predetermined quantity of ice may be formed in said passage, without interrupting the flow of the remainder of said fluid therethrough.

3. In combination, refrigerating means adapted to form ice within a certain region, a casing extending into said region, and a conduit positioned within said casing with the inner end thereof within said region.

4. Apparatus of the class described comprising means adapted to form ice within a desired region, a casing extending into said region, and a pipe adapted to carry a fluid to be cooled positioned within said casing with the inner end thereof in said region, so that a portion only of said fluid is frozen, leaving a passage for the escape of the unfrozen fluid.

5. Means adapted to form ice within a certain range, a casing having one end closed and having an outlet passage at the other end, and a pipe extending into said casing toward the closed end provided with an opening positioned within said freezing range, whereby ice may be formed around said inlet pipe.

6. A container for a liquid, a refrigerating element positioned in said container adapted to form ice within a predetermined radius, a casing having one end thereof closed and the other end provided with an inlet, and a fluid supply pipe passing through said inlet and positioned within said casing so that the outlet thereof is within said ice forming radius.

7. In combination, a container for a fluid, refrigerating means adapted to freeze a certain portion of said fluid, a plurality of elongated casings positioned to extend into the frozen fluid in a predetermined manner, and means for supplying to said casings a liquid to be cooled, whereby a predetermined portion of said liquid is frozen, said means having openings in immediate proximity to the frozen liquid within said casings.

8. A refrigerating device adapted to exert a freezing effect within a desired region, and a plurality of casings extending into said region, each casing having a fluid supply pipe provided with an opening within said region, said fluid freezing around said pipe but leaving an outlet passage from said pipe for the fluid passing through from said supply pipe.

9. A refrigerating unit having a plurality of refrigerating coils, and a pair of horizontally positioned casings having closed ends in immediate proximity thereto, the remaining ends being provided with inlet and outlet passages, said inlet passages terminating adjacent to the closed end of said casings and the coils forming ice in the ends of said casings.

10. The method of cooling a fluid in a refrigerating system, which consists in conducting the fluid within the freezing radius of a refrigerating unit, so that a portion only of said fluid is frozen, and thereafter intermittently passing the remaining fluid over the frozen fluid in accordance with the load on the system.

JOHN P. GREEN.